April 12, 1955   R. D. ARBOGAST   2,706,214
BATTERY HAVING SEAL-CLOSURE
Filed Oct. 1, 1953
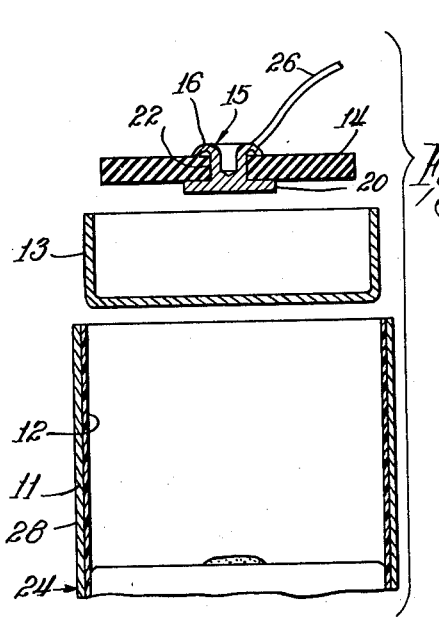
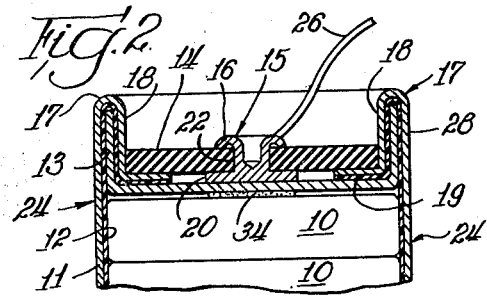
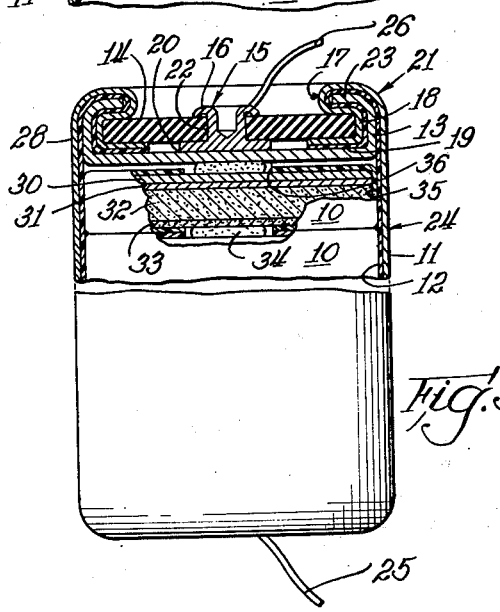
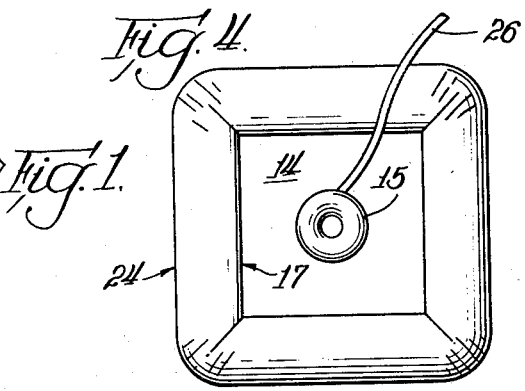
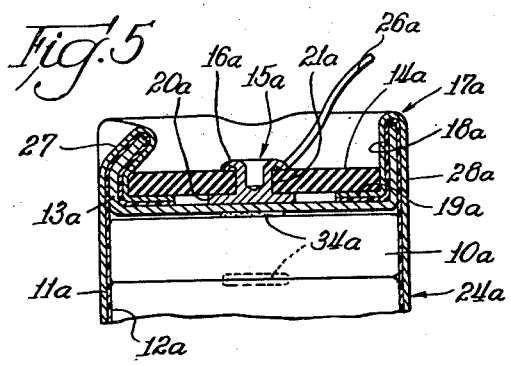
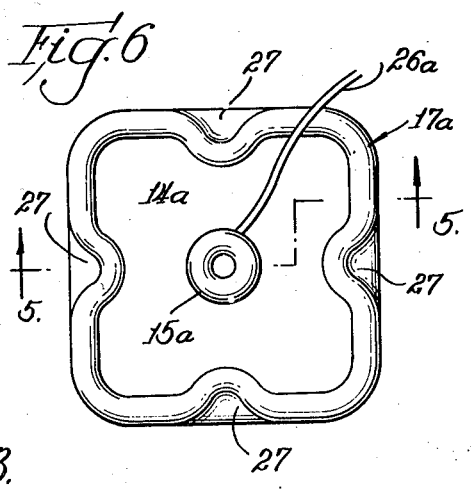
INVENTOR.
Ray D. Arbogast
BY
Jones, Tesch & Darbo Attys.

United States Patent Office 2,706,214
Patented Apr. 12, 1955

2,706,214

BATTERY HAVING SEAL-CLOSURE

Ray D. Arbogast, Freeport, Ill., assignor to Burgess Battery Company, Freeport, Ill., a corporation of Delaware Application October 1, 1953, Serial No. 383,587

9 Claims. (Cl. 136—133)

This invention relates to dry batteries and more particularly to a multiple-cell battery having a compression-lock-seal at the casing closure thereof, and the method of making the same.

In series-connected electric dry batteries employing flat cells in a stacked relationship, it is common to employ tape, retainer straps, tie bolts or other means to maintain the cells in a parallel juxtaposed compressed relationship. All of such retaining means occupy space within the allotted dimensions of the battery and thereby reduce the amount of space available for active materials.

One of the objects of this invention is to provide an improved seal-closure for the battery casing.

Another object is to provide an improved battery casing of the character described wherein the maximum amount of space is available for active material, and also wherein the cells are maintained in a state of compression.

Another object is to provide a closure structure in which a cam action is taken advantage of in the final step of construction to provide the desired firm compression upon the stack.

Another object is to provide an improved closure which is simple to manufacture and economical in cost.

Further objects and advantages will become apparent from the following description.

Briefly, the objects of the invention are attained by providing an open-ended dielectric casing and within each end thereof disposing a metal tray with the rim of the tray projecting outwardly, and folding the extending ends of the casing over the edge and downwardly and inwardly upon the interior of the tray. A stiff member having a terminal therein is disposed within the casing-covered tray and the rim of the tray and folds of the casing are bent inwardly over the marginal portion of the stiff member whereby a cam action is created in which the casing is placed under tension and the bottom of the tray is pressed against the stack of cells.

In the drawings

Fig. 1 is an expanded sectional view of the elements comprising the end closure of one embodiment of the invention;

Fig. 2 is a view similar to Fig. 1 showing the elements drawn together, at an intermediate stage of the making of the closure;

Fig. 3 is an elevational view, partly in section, of a battery utilizing the parts and arrangement shown in Figs. 1 and 2, showing the completed closure;

Fig. 4 is a plan view of the battery shown in Fig. 3;

Fig. 5 is a partial sectional elevation of a different embodiment of the invention, taken along line 5—5 of Fig. 6; and Fig. 6 is a plan view of the embodiment shown in Fig. 5.

The invention is applicable in making a casing closure with a terminal therein for batteries composed of cells of any shape and employing any type of electrical connecting elements. It is advantageously utilized in a battery of flat cells, stacked together in a juxtaposed relation and connected in series, and the invention is described in connection with such an embodiment. In the illustrations, the size and thickness of the cell elements are exaggerated for the sake of clearness.

The battery illustrated in Figs. 1 to 4 includes a stack of juxtaposed flat cells 10 connected in series to provide the desired voltage between the battery terminals 25 and 26. The construction of the cells is not a part of the invention, an example, as shown in Fig. 3, comprising a negative electrode 30 of zinc, a bibulous paper separator 31, a mix cake 32 of the conventional mixture of powdered manganese dioxide and carbon, and a positive electrode 33 of carbon. The mix cake and bibulous separator are moistened with the electrolyte, which may be the usual aqueous solution of zinc chloride and ammonium chloride. Each cell is enclosed in an envelope 35 of thin, flexible, electrolyte-resistant, dielectric material such as rubber hydrochloride, the copolymer of vinyl chloride and vinyl acetate or the like, said envelope having an opening 36 in each of the broad faces of the cell. The positive electrode 33 of each cell is exposed to the negative electrode 30 of the adjacent cell at the openings 36, and said electrodes are connected together by the plastic conductive masses 34, which may be composed of finely divided silver particles in a wax-like binder-lubricant such as microcrystalline wax, as is disclosed in the copending application of Sam Kurlandsky, Serial No. 161,892, filed May 13, 1950.

The stack of cells 10 is disposed in a hollow open-ended dielectric, liquid-impervious, electrolyte-resistant casing 24. The inner surface of the casing is preferably in adherent relation to the lateral surfaces of the stack of cells. Casing 24 is composed of an outer layer 11 of a tough sheet material such as sulfite paper, kraft paper or the like, and an inner layer 12 of a thin, thermoplastic, liquid-impervious material such as rubber hydrochloride, polyethylene, cellulose acetate or the like. The layers 11 and 12 are bonded together by an adhesive, preferably a thermoplastic adhesive such as polyvinyl acetate, the copolymer of vinyl acetate and vinyl chloride, or the like to form a laminated casing wall. The designed shape of the casing 24 provides a snug fit between the inner layer 12 thereof and the lateral surfaces of the cells 10.

In accordance with the present invention, the stack of cells is inserted endwise into the casing in such manner that opposite end portions 28 of the casing 24 project a substantial distance beyond the end cells of the stack. The same closure structure is employed at each end and only one such structure will be described. A shallow conductive metal tray 13 having substantially the same lateral size and shape as the cells 10 is fitted snugly within the projecting end portion 28 of casing 24 with the rim substantially parallel and contiguous to the casing wall and projecting away from the stack, the arrangement being such that the casing extends a substantial distance beyond the rim of the tray as shown in Fig. 2. The tray is composed of any suitable malleable conductive metal such as copper, zinc, brass, or the like. The underside of the tray bottom is in mechanical pressure transmissive relation to the stack of cells and is electrically connected by the conductive mass 34 to the terminal of the end cell which is exposed at the opening 36 in the envelope 35 of said cell. The tray 13 serves as an integral part of the casing closure and also acts as a conductor between the end cell of the stack and the battery terminal as will be described hereinafter.

After the trays 13 are in position at both ends of the casing, inward pressure is applied simultaneously at the bottoms of the trays so that the cells and end trays are compressed together in the direction of the longitudinal axis of the stack. While the stack is under compression, heat and inward lateral pressure are applied to the casing 24 by means of heated platens (not shown) whereby the inner layer 12 of the casing is heat-bonded or welded to the portions of the envelopes 35 which cover the lateral surfaces of the cells 10. Said longitudinal compression of the stack promotes high conductivity at the intercell connections and the connections between the end cells and the trays 13 by placing the conductive masses 34 in firm pressure contact with the contiguous conducting surfaces. Such pressure also unites the stack into a firm integral unit and the heat-welding of the cell envelopes to the casing wall assists in maintaining this condition.

At each end of the battery, the end portion 28 of the casing 24 extending beyond the rim of tray 13 is folded inwardly over the edge of said rim at 17 and downwardly against the interior surface of the rim to form the downwardly extending portion 18, and inwardly against the bottom of the tray for a substantial distance to form the horizontal extension 19. The latter extension leaves exposed the central portion of said bottom surface. Heated dies are employed for the folding and tucking operations whereby the material of the casing 24 is softened, and tight, smooth folds and tucks are obtained. The thermoplastic inner layer 12 of the casing does not become attached to the surface of tray 13. The extensions 18 and 19 may be attached to the interior surfaces of the tray by an adhesive if desired.

A rigid dielectric plate 14 having a conductive terminal 15 projecting therethrough is then placed within the casing-covered tray, as shown in Fig. 2. Said members are united in a subassembly as shown in Fig. 1. In the illustrated embodiment, the dielectric plate 14 is of substantial thickness, and it is composed of any suitable dielectric material such as synthetic resin, fiber board, cellulose acetate or the like. It has a central aperture 22 through which extends the metal conductive terminal rivet 15. The rivet 15 has an outwardly swaged top head 16 beneath which is clinched the battery terminal conductor 26, and a bottom head 20 in conductive contact with the uncovered portion of the bottom of tray 13, thus forming an electrical connection between the end terminal of the stack and the battery terminal 26. The edge and bottom surfaces of the plate 14 are in contact with the extensions 18 and 19 of the casing 24 whereby said extensions are held in fixed relation to the tray 13.

To complete the terminal-closure, the upwardly projecting rim of tray 13, and the portions 17 and 18 of casing 24 which are folded over said rim, are turned inwardly at the bend 21 a substantial distance to form an inwardly extending flange 23 about the periphery of the tray, the arrangement being such that the plate 14 is firmly clamped between the extensions 18 and 19 of the casing 24 which line the interior of flange 23 and the bottom of tray 13, terminal member 15 makes firm conductive contact with the bottom of the tray, and extensions 18 and 19 are firmly clamped or locked in position by the plate 14.

An important advantage of the closure arrangement is that a cam action occurs at the bend 21 when the casing-covered tray rim is turned inwardly. As an explanation of this cam action, the material of the casing within tray 13 is held fast to the tray by the plate 14 and also because it is tucked tightly into the tray, and there is no relative movement between these parts. When the flange 23 is turned inwardly, the material of casing 24 contiguous to the exterior of the rim describes a greater radius of curvature at the bend 21 than does the rim. As a result, the material of the casing is placed under tension longitudinally of the battery, and the tray 13 is pressed tightly against the end of the stack.

As stated heretofore, the same terminal-closure structure is provided at both ends of the battery. The effect of the structure is that the cell stack and the terminal-closure at the ends of the battery are placed under firm compression which results in a compact, rugged battery in which alignment of the stack is preserved, elongation is prevented and all electrical connections are highly conductive and durable. A further advantage is that the compression is maintained throughout the life of the battery.

If desired, the entire battery may be provided with a protective covering as by dipping in a bath of molten wax such as microcrystalline wax. Upon cooling the wax solidifies and forms a complete seal enclosure which protects the battery against handling and high relative humidity.

A second embodiment of the invention is illustrated in Figs. 5 and 6. This embodiment is similar to the embodiment of Figs. 1 to 4 with the difference that the inwardly turned flange 23 is omitted and in its place a number of crimped indentations are provided in the rim of the tray. The corresponding elements of this embodiment are designated by the same numerals with the suffix "a" added thereto. In this embodiment, one crimped indentation 27 is provided substantially centrally of each side wall of the tray 13a. At said indentations 27 the material of the casing 28a and of the side wall of the tray 13a is turned inwardly at an angle and exerts a downward clamping pressure upon the marginal portions of the dielectric plate 14a, with the result being that the parts are clamped together in fixed relationship in the same manner as described in connection with the embodiment of Figs. 1 to 4. A cam action is accomplished by the turning in of the indentations 27 in the same manner as described heretofore in connection with the turning in of the flange 23 of the embodiment of Figs. 1 to 4. The tensile force exerted upon the material of casing 24a is sufficient to tauten the casing wall and retain the cells in the aligned compressed condition and provide highly conductive durable connections within the battery. A separate detailed description of this embodiment is omitted since the structure is similar to that of the embodiment of Figs. 1 to 4 except for the differences which have been described.

It has been found that the described constructions provide superior resistance against leakage of battery liquid which may emanate from the cells, and eliminate the necessity for additional means, such as tape, retainer straps, tie bolts, or the like to maintain the cells in a compressed aligned position. The provision of a dielectric casing eliminates the risk of external short circuits. The shoulders formed by the bend 21 and flange 23, and by the indented rim 17a, serve as a buttress against shock; and the recessed position of the terminals 15 and 15a with respect to the top edges of the batteries reduces the likelihood of damage to the terminal seal due to rough handling. The thinness of the casing walls and the elimination of a need for other means to maintain the cells in an aligned, compressed condition allows a maximum amount of space for the active elements of the battery. In addition, the turning inwardly of the tray 13 and the casing 24 serves to lock the cells 10 and plate 14 tightly in place. The casing extensions 18 and 19, being in tight contact with the inner surface of the tray, provide resistance against creepage of liquids to the outside of the battery.

In the specification and claims, words such as "top," "inward," "upward," and the like are used for convenience and are not used in a restrictive sense.

While only two embodiments of the invention have been illustrated and described, the invention is not limited thereto but embraces such departures as may be obvious to those skilled in the art. For example, while bonding of the lateral surfaces of the cells to the casing 24 as has been described is preferred, such bonding may be dispensed with if desired. Likewise, although it is preferred to include the horizontal extension 19 of the casing wall, which rests in contact with the bottom of the tray 13, the extension may be omitted if desired and the casing wall terminated at the end of portion 18 thereof. Other changes may be made by those skilled in the art.

Invention is claimed as follows:

1. A battery comprising a plurality of series-connected flat cells stacked within an initially open-ended dielectric casing, each said cell having a thermoplastic dielectric envelope therefor, said casing having a thermoplastic interior lining heat-bonded to the envelopes of the cells of said stack, at each end of said casing a terminal-closure which comprises an outwardly opening shallow metal conductive tray within the open end of said casing, the bottom of said tray being in mechanical contact and electrical connection with the end cell of said stack, the rim of said tray being substantially parallel and contiguous to the wall of said casing, the wall of said casing initially extending beyond said rim and said extending portion being folded inwardly upon the edge of said rim, downwardly against the interior surface of said rim and inwardly against the bottom of said tray a substantial distance, leaving the mid-portion of said tray bottom uncovered, a stiff dielectric plate within said tray, a conductive terminal member extending through said plate and making mechanical and electrical contact with the bottom of said tray, the outer portion of said casing-enclosed rim being bent inwardly into downward pressure engagement with the marginal portion of the upper surface of said dielectric plate by a cam action in which the casing is placed under tension and the bottom of said tray is placed under pressure against said stack.

2. The battery as claimed in claim 1 in which the casing is a laminated structure having an interior thermoplastic layer and an exterior layer of non-thermoplastic dielectric material.

3. A battery comprising a plurality of series-connected flat cells stacked within an initially open-ended dielectric casing, said casing being adhesively attached to the lateral surfaces of said stack of cells, at each end of said casing a terminal-closure which comprises an outwardly opening shallow metal conductive tray within the open end of said casing, the bottom of said tray being in mechanical contact and electrical connection with the end cell of said stack, the rim of said tray being substantially parallel and contiguous to the wall of said casing, the wall of said casing initially extending beyond said rim and said extending portion being folded inwardly upon the edge of said rim, downwardly against the interior surface of said rim and inwardly against the bottom of said tray a substantial distance, leaving the mid-portion of said tray bottom uncovered, said extending portion of said casing being in adhesive attachment to the surfaces of said tray contiguous thereto, a stiff dielectric plate within said tray, a conductive terminal member extending through said plate and making mechanical and electrical contact with the bottom of said tray, the outer portion of said casing enclosed rim being bent inwardly into downward pressure engagement with the marginal portion of the upper surface of said dielectric plate by a cam action in which the section of the casing contiguous to the exterior surface of said rim is placed under tension and said marginal surface of said dielectric plate is placed under compression which is transmitted downwardly through said plate, terminal, and tray bottom to said cell stack.

4. A battery comprising a plurality of cells stacked within an initially open-ended dielectric casing, said casing being adhesively attached to the lateral surfaces of said stack of cells, at each end of said casing a closure which comprises an outwardly opening tray within the open end of said casing, the bottom of said tray being in mechanical pressure transmissive relation with the end cell of said stack, the rim of said tray being adjacent to the wall of said casing, the wall of said casing initially extending beyond said rim and said extending portion being folded inwardly upon the edge of said rim, downwardly against the interior surface of said rim and inwardly against the bottom of said tray, a rigid member within said tray, said casing-enclosed rim being bent inwardly into downward pressure engagement with the upper surface of said rigid member by a cam action in which said casing is placed under tension and said tray is placed under pressure against said stack.

5. A battery comprising a plurality of cells stacked within an initially open-ended dielectric casing, at each end of said casing a closure which comprises an outwardly opening tray within the open end of said casing, the bottom of said tray being in mechanical pressure transmissive relation with the end cell of said stack, the rim of said tray being adjacent to the wall of said casing, the wall of said casing initially extending beyond said rim and said extending portion being folded inwardly against the interior surface of said tray, means for fixing said extending portion of said casing against movement relative to said tray, said casing-enclosed rim being bent inwardly whereby a cam action occurs in which the portion of said casing exterior to the foregoing assembly of cell stack and tray is placed under tension and the bottom of said tray is placed under pressure against said stack.

6. A battery comprising a plurality of cells stacked within an initially open-ended dielectric casing, at each end of said casing a closure which comprises an outwardly opening tray within the open end of said casing, the bottom of said tray being in mechanical pressure transmissive relation with the end cell of said stack, the rim of said tray being adjacent to the wall of said casing, the wall of said casing initially extending beyond said rim and said extending portion being folded inwardly along the edge of said rim and downwardly against the interior surface of said rim, a rigid member within said tray, said casing-enclosed rim being bent inwardly into downward pressure engagement with the upper surface of said rigid member by a cam action in which the portion of said casing exterior to the foregoing assembly of cell stack and tray is placed under tension and the bottom of said tray is placed under pressure against said stack.

7. A battery comprising a plurality of cells stacked within an initially open-ended dielectric casing, at each end of said casing a closure which comprises an outwardly opening tray within the open end of said casing, the bottom of said tray being in mechanical pressure transmissive relation with the end cell of said stack, the rim of said tray being adjacent to the wall of said casing, the wall of said casing initially extending beyond said rim and said extending portion being folded inwardly upon the edge of said rim and downwardly against the interior surface of said rim, a rigid member within said tray, said casing-enclosed rim being locally crimped inwardly at spaced-apart points thereof into downward pressure engagement with the upper surface of said rigid member by a cam action in which the portion of said casing exterior to the foregoing assembly of cell stack and tray is placed under tension and the bottom of said tray is placed under pressure against said stack.

8. A battery comprising a plurality of cells stacked within an initially open-ended dielectric casing, at each end of said casing a closure which comprises an outwardly opening tray within the open end of said casing, the bottom of said tray being in mechanical pressure transmissive relation with the end cell of said stack, the wall of said casing initially extending beyond said rim and said extending portion being folded inwardly upon the edge of said rim and downwardly against the interior surface of said rim, a rigid member within said tray, said casing-enclosed rim being turned inwardly to form a flange in downward pressure engagement with the upper surface of said rigid member, said downward pressure being transmitted by said rigid member to the bottom of said tray and thence to said stack.

9. In a battery comprising a plurality of cells stacked within a dielectric casing initially having an open end, a closure at said end of said casing comprising an outwardly opening tray within the open end portion of said casing, the bottom of said tray being in mechanical pressure transmissive relation with the end cell of said stack, the rim of said tray being adjacent to the wall of said casing, the wall of said casing initially extending beyond said rim and said extending portion being folded inwardly against the interior surface of said tray, means for fixing said extending portion of said casing against movement relative to said tray, said casing-enclosed rim being bent inwardly whereby a cam action occurs in which the portion of said casing exterior to the foregoing assembly of cell stack and tray is placed under tension and the bottom of said tray is placed under pressure against said stack.

References Cited in the file of this patent

UNITED STATES PATENTS

| | | |
|---|---|---|
| 2,060,796 | Cahoon | Nov. 17, 1936 |
| 2,307,761 | Deibel | Jan. 12, 1943 |